United States Patent [19]
Douglas

[11] 3,888,273
[45] June 10, 1975

[54] VARIABLE ORIFICE GAS LIFT VALVE

[75] Inventor: Bobby L. Douglas, Houston, Tex.

[73] Assignee: Dresser Industries, Inc., Dallas, Tex.

[22] Filed: Jan. 21, 1974

[21] Appl. No.: 435,051

[52] U.S. Cl. ............... 137/155; 417/117; 417/115; 417/112
[51] Int. Cl.² ........................................... F04F 1/20
[58] Field of Search ........... 137/501, 503, 504, 155, 137/517, 614.18; 417/110, 117, 112, 115

[56] References Cited
UNITED STATES PATENTS

| | | |
|---|---|---|
| 2,633,147 | 3/1953 | Badami ........................... 137/503 X |
| 3,286,736 | 11/1966 | Guillermic ................. 137/614.18 X |
| 3,381,708 | 5/1968 | Chenoweth ......................... 137/504 |
| 3,521,977 | 7/1970 | Chenoweth ......................... 137/155 |
| 3,559,671 | 2/1971 | Douglas ............................. 137/155 |
| 3,575,194 | 4/1971 | McMurry ............................ 137/155 |
| 3,603,394 | 9/1971 | Raulins .......................... 137/517 X |
| 3,834,414 | 9/1974 | McMurry ............................ 137/155 |

*Primary Examiner*—Alan Cohan
*Attorney, Agent, or Firm*—Michael J. Caddell

[57] ABSTRACT

A gas lift valve for use in oil wells utilizes a variable-area flow orifice with the amount of flow area being inversely proportional to the difference in pressure between the casing and the tubing.

14 Claims, 6 Drawing Figures

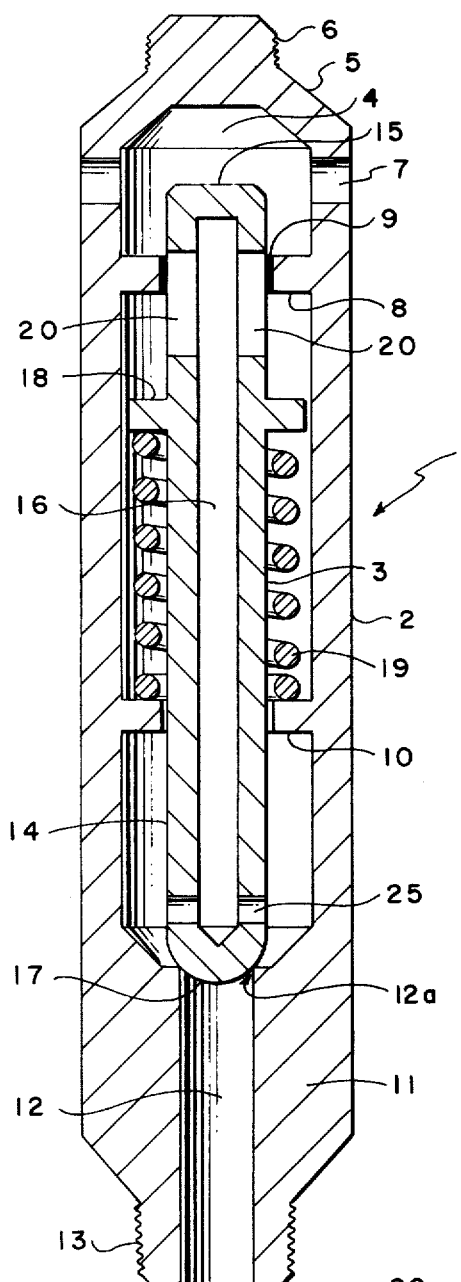
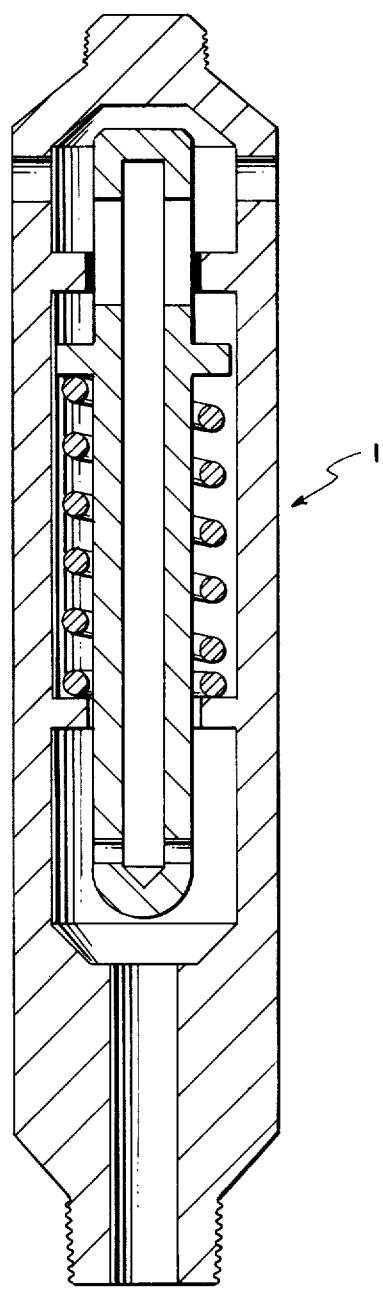
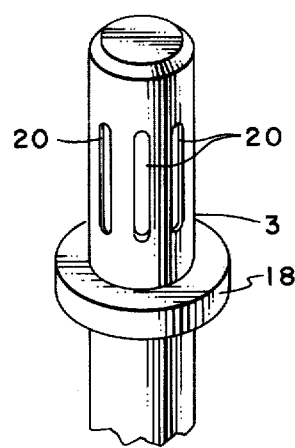
FIG. 1
FIG. 2
FIG. 3

PATENTED JUN 10 1975

SHEET 2

3,889,273

VARIABLE ORIFICE GAS LIFT VALVE

BACKGROUND OF THE INVENTION

In producing liquid hydrocarbons from oil wells penetrating low pressure formations it often becomes necessary to provide a lifting force to bring the oil to the surface since the formation pressure often becomes too low to push the liquids up the production string to the surface. One such method of lifting the liquids in the tubing involves the injection of gas under pressure into the casing (between the casing wall and the tubing wall), through a valve near the end of the tubing and into the column of fluid in the tubing string. The gas then lightens the column of fluid and lifts it to the surface where it is collected and pumped off.

One type of valve apparatus for performing the valve lift operation has a valve member between the casing and the tubing with an expandable bellows attached to the valve member. The bellows usually contains a preset gas charge and is subject to external pressure from gas in the casing. As the casing pressure increases past the tubing pressure it contracts the bellows moving the valve member out of its seat and allowing the pressurized gas to move from the casing into the tubing as desired.

The disadvantages of this type of device include the problem occurring when the casing pressure is too high and too much gas may be injected possibly causing a blowout, or, when the tubing or formation pressure begins an unexpected rise the casing-tubing differential drops to a value where the valve member will not open sufficiently to offset the increased height of fluid in the tubing.

The present invention provides a variable flow valve with the available flow area being inversely proportioned to the differential pressure between casing and tubing so that as the tubing pressure increases with a heightened column of fluid, the gas lift valve will respond with injections of greater quantities of gas.

BRIEF DESCRIPTION OF THE DRAWINGS

FIG. 1 illustrates a cross-sectional longitudinal view of the gas lift valve;

FIG. 2 illustrates the valve of FIG. 1 in a second operative position;

FIG. 3 is an isometric view of one element of the valve of FIG. 1 looking slightly downward from the top;

DESCRIPTION OF THE PREFERRED EMBODIMENTS

Figure 4:
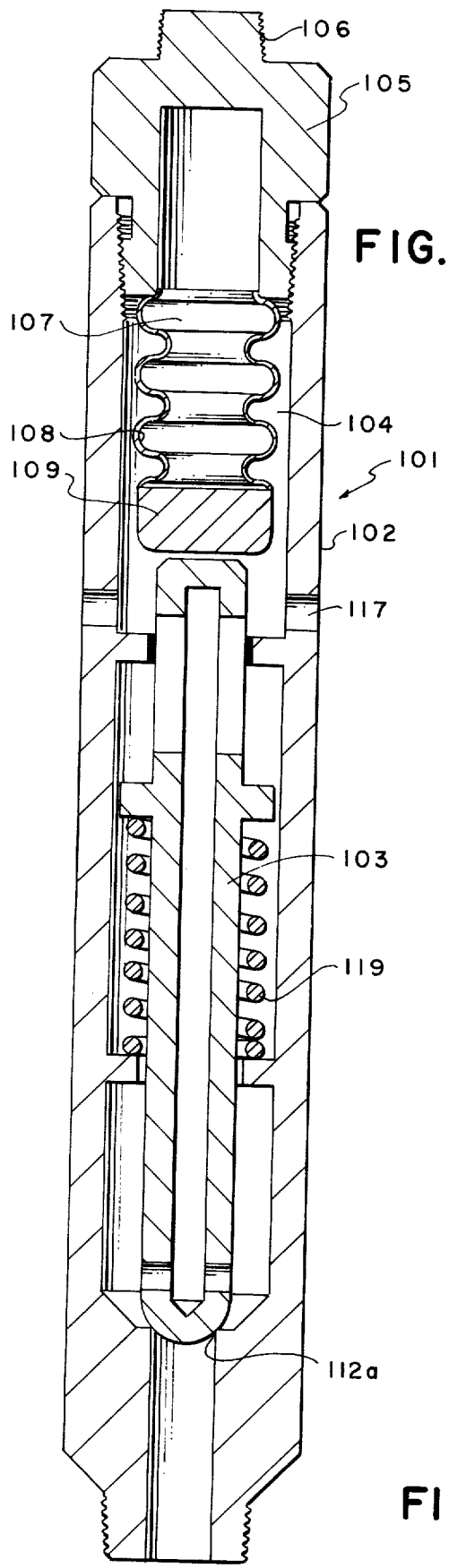
FIG. 4 is a cross-sectional view of a second embodiment of the invention.

In FIGS. 1 through 3 one preferred embodiment of the invention is disclosed wherein a gas lift valve assembly 1 comprises a tubular housing 2 and a slidable valve mandrel 3 located in the housing.

Housing 2 has an upper flow chamber 4 formed by an upper head 5 of the housing, which head has a threaded or other type of connector 6 for attachment to a tubing string.

A plurality of ports 7 pass through the wall of housing 2 to communicate with chamber 4. Housing 2 has an annular inner ridge or ring 8 having an inner circular seal 9 therein. A second inner projecting ridge 10 is located in housing 2 a spaced distance from ridge 8.

The lower end of housing 2 has thicker wall sections 11 and a lower bore passage 12 whose upper end forms a valve seat 12a. A threaded connection 13 may be provided at the lower end of the valve housing to allow the tool to be inserted into a tubing assembly.

An elongated cylindrical valve member 3 is slidably located concentrically within housing 2 in sealing engagement with seal 9 of ridge 8 and passing through annular ridge 10. Member 3 has an upper closed end 15, a central section 14, a partially enclosed longitudinal bore passage 16 passing almost the entire length of member 3, and a lower seating portion 17 arranged to abut seat 12a of the housing to close off bore 12.

The valve member also has an outwardly projecting radial shoulder 18 formed on the outer surface thereof and located between the upper and lower ridges 8 and 10 of the housing. A coil spring 19 in compression is abutted against the upper side of ridge 10 and the lower surface of shoulder 18 to provide a constant upward biasing force on member 3 in housing 2.

A series of parallel, longitudinal vertical slots 20 are formed through the wall of member 3 in the area adjacent seal 9. FIG. 3 gives another view of the placement of slots 20. The slots and seal 9 serve to provide a variable size flow path from ports 7 to inner bore 16 by working in conjunction with fluid pressures and coil spring 19 to vary the flow area from ports 7 to bore 16 as the valve member 3 moves.

A plurality of lower flow ports 25 pass through the lower end of valve member 3 and communicate the lower end of bore 16 with the inner bore of housing 2.

The operation of the valve is pressure dependent and results from tubing pressure acting upward in bore 12 against the area of member end 17 located inside seat 12a, in conjunction with the upward force of coil spring 19 against ridge 18. These upward forces are opposed by casing pressure acting downward on member 3 across the same cross-sectional area across seat 12a.

Figure 6:
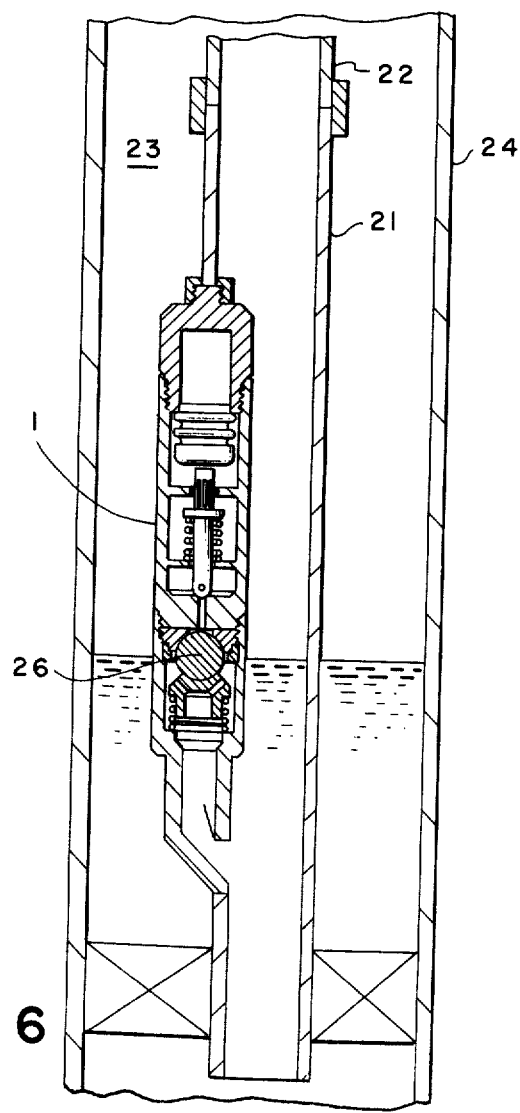
FIG. 6 is a schematic view of the valve assembly in place in a cased oil well.

FIG. 6 illustrates the variable orifice gas lift valve assembly 1 in place on a tubing mandrel 21 attached to the end of a tubing string 22. Upper ports 7 are exposed to casing pressure through the annulus 23 between the tubing and the casing 24.

Pressurized lift gas is injected into the casing at ground level and traverses the annulus to ports 7, through ports 7 and slots 20 into bore 16. From bore 16 the pressurized gas exits lower ports 25 into housing 2 and from there passes through seat 12a into bore 12 and up into the production string via a standard back flow check valve 26 located therebelow (see FIG. 6).

As illustrated in FIG. 1, valve member 3 is positioned in its lowest position in housing 2 with end surface 17 seated in valve seat 12a. Preferably, a small portion of slots 20 extend above seal 9 to allow a restricted flow of gas therethrough as explained above.

It is obvious that when the casing pressure is considerably higher than the tubing pressure, the differential will act downward on valve member 3 causing a partial closing of slots 20 in seal 9 and seating of end 17 in valve seat 12a. This prevents a blowout of casing gas up through the tubing string due to the high pressure differential.

As the pressure differential decreases due to a rising fluid column in the tubing, the force of spring 19 will gradually move member 3 upward, opening up a greater length of slots 20 above seal 9 and allowing injection of greater volumes of lift gas to compensate for the additional weight of fluid in the tubing. This results in a higher output of well fluids from the well and serves to automatically regulate the amount of injected lift gas to prevent critical pressure imbalances from occurring as a result of changing pressures in the formation. FIG. 2 illustrates the valve 1 in its opened, high flow rate orientation.

Should the tubing (or formation) pressure decrease, this will result in an increase of pressure differential acting downward on member 3 moving it downward, thereby reducing the exposed area of ports 20 above seal 9 and reducing the amount of injected gas to correspond with the lowered fluid column in the tubing.

ALTERNATE EMBODIMENTS

In FIG. 4 an alternate construction of the valve is illustrated in which a pressure responsive expandable bellows system has been added to provide an automatic valve closing system which becomes operable should the casing pressures drop drastically or be deliberately removed from the system.

In this embodiment the valve 101 is essentially similar to valve 1 except the head 5 of valve 1 has been replaced by a removable bellows cap 105 which is threadedly engaged in the upper end of housing 102. The bellows cap encloses a bellows chamber 107 and has attached thereto an expandable-wall bellows 108 containing a lower bellows abutment head 109. The chamber 107 is sealed and contains a compressed inert gas which, under normal atmospheric conditions at downhole location, serves to maintain head 109 pressed downward on valve member 103 seating it in valve seat 112a thereby keeping valve 101 closed to gas flow.

Upon pressurizing the casing the gas pressure flows through ports 117, into chamber 104 thereby compressing bellows 108 and the gas in chamber 107 moving the abutment head 109 upward and allowing movement of valve member 103 to the upper, opened position.

Upon a high pressurization of the casing whereupon a large downward differential pressure force acts on member 103 the bellows head will not close the valve but the high pressure differential will by overcoming the force of spring 119. Thus closing of the valve is accomplished at very low relative casing pressures and at relatively high casing pressures.

Figure 5:
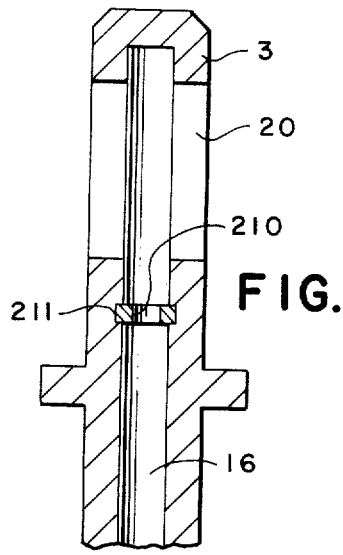
FIG. 5 is a cross-sectional view of a portion of the valve assembly having another embodiment incorporated therein.

FIG. 5 illustrates another embodiment of the valve member in which a replaceable orifice choke ring 210 is located concentrically in an annular groove 211 in the inner bore wall of member 3. Ring 210 has an orifice opening through the center thereof which controls the maximum flow area through bore 16 of valve member 3. The maximum bore area of the valve can be preset at any desirable value before placing the valve in the well by utilizing an orifice ring 210 having the desirable orifice size or by omitting the ring 210 entirely to obtain full open bore.

Thus in the embodiment of FIG. 5 a variable orifice is maintained via the interaction of slots 20 and seal 9 up to the point where the variable orifice area reaches the size of the orifice area of ring 210 and then further opening of slots 20 through seal 9 achieves no further increase in flow area through member 3.

Although certain preferred embodiments of the present invention have been herein described in order to provide an understanding of the general principles of the invention, it will be appreciated that various changes and innovations can be effected in the described gas lift valve apparatus without departing from these principles. For example, other biasing means than coil springs could be used, and spring means could be used to supplement the bellows means. All modifications and changes of this type are deemed to be embraced by the spirit and scope of the invention except as the same may be necessarily limted by the appended claims or reasonable equivalents thereof.

The embodiments of the invention in which an exclusive property or privilege is claimed are defined as follows:

1. A variable flow gas lift valve assembly comprising:
    external housing means having an internal longitudinal bore passage therein and a plurality of ports through the wall thereof, said housing means adapted for interconnection in a well tubing string in a well bore;
    an elongated valve member located slidably within said housing means and having an inner bore passage partially therethrough;
    valve means between said valve member and said housing means;
    differential pressure responsive means on said valve member responsive to a differential pressure between a well bore and a tubing string containing said gas lift valve assembly; and,
    variable flow orifice means on said valve member arranged to communicate said plurality of ports with said valve means through a variable flow area inversely proportional to said differential pressure acting on said pressure differential responsive means.

2. The variable flow gas lift valve assembly of claim 1 further comprising expandable closing means in said housing means arranged to abut said valve member and adapted to respond to pressure from said housing means ports.

3. The variable flow gas lift valve assembly of claim 1 further comprising replaceable flow choke means located removeably in said valve member inner bore passage, said choke means having a flow orifice therethrough adapted to limit flow through said valve member bore passage.

4. The valve assembly of claim 2 wherein said expandable closing means further comprises an expandable bellows element attached to a bellows cap on said housing means and containing a compressed gas charge with a lower bellows head sealing said bellows element; said bellows element and head extending downward from said bellows cap into said housing means in close proximity to said valve member.

5. The gas lift valve assembly of claim 1 wherein said housing means further comprises:
    an elongated tubular housing having a relatively large bore passage extending substantially throughout the longitudinal dimension thereof;
    a first, inwardly projecting, annular shoulder within the bore passage of said housing and attached to the inner wall of said housing;
    seal means located on said first shoulder on the innermost surface thereof arranged to sealingly contact said valve member;

a second, inwardly projecting, annular shoulder on the inner wall of said housing;

said plurality of ports passing through the wall of said housing above said seal means and said first shoulder; and, a restricted flow passage passing axially downward from said large bore passage to the bottom of said housing, said restricted flow passage having a valve seat at the upper end thereof adapted to sealingly receive said valve member.

6. A variable flow gas lift valve assembly comprising: external housing means having an internal longitudinal bore passage therein and a plurality of ports through the wall thereof, said housing means adapted for interconnection in a well tubing string in a well bore and further comprising:

an elongated tubular housing having a relatively large bore passage extending substantially throughout the longitudinal dimension thereof;

a first, inwardly projecting, annular shoulder within the bore passage of said housing and attached to the inner wall of said housing;

seal means located on said first shoulder on the innermost surface thereof arranged to sealingly contact said valve member;

a second, inwardly projecting, annular shoulder on the inner wall of said housing;

said plurality of ports passing through the wall of said housing above said seal means and said first shoulder;

a restricted flow passage passing axially downward from said large bore passage to the bottom of said housing, said restricted flow passage having a valve seat at the upper end thereof adapted to sealingly receive said valve member;

an elongated valve member located slidably within said housing means and having an inner bore passage partially therethrough, said valve member further comprising:

an elongated tubular cylindrical member having a central longitudinal bore passage from near one end to near the opposite end;

a plurality of longitudinal slots passing through the wall of said member above and below said seal means, communicating said central bore passage with said housing bore and said housing ports;

an annular, outwardly projecting, radial shoulder attached to said member below said slots;

a plurality of ports through the wall of said member below said radial shoulder;

a valve surface on the lower portion of said member arranged to sealingly engage said valve seat;

valve means between said valve member and said housing means;

differential pressure responsive means on said valve member responsive to a differential pressure between a well bore and a tubing string containing said gas lift valve assembly; and, variable flow orifice means on said valve member arranged to communicate said plurality of ports with said valve means through a variable flow area inversely proportional to said differential pressure acting on said pressure differential responsive means.

7. The gas lift valve assembly of claim 6 further comprising resilient biasing means between said valve member and said housing arranged to continuously bias said valve member out of engagement with said valve seat.

8. The gas lift valve assembly of claim 7 wherein said differential pressure responsive means further comprises a first pressure responsive area on said valve member communicating with pressure from said housing ports, and a second pressure area on said valve member communicating with said housing restricted flow passage; said first area arranged to receive pressure on said valve member opposing said resilient biasing means, and said second area arranged to receive pressure on said valve member opposing said first area pressure and supplementing said resilient biasing means.

9. An oil well gas injection valve adapted to be interconnected in a tubing string in a well bore, said valve comprising:

a tubular housing having internal seal means therein;

valve member means located slidably in said tubular housing contacting said seal means;

port means through the wall of said housing;

a gas injection passage extending through the bottom of said housing;

valve seating means in said housing injection passage;

valve seating surface on said valve member means arranged to seat in said seating means;

flow passage means through said valve member means communicating said port means with said valve seating means in said housing injection passage; and, elongated flow openings through the wall of said valve member means communicating with said flow passage means and traversing said housing internal seal means.

10. The gas injection valve of claim 9 wherein said valve member means further includes first and second pressure responsive areas thereon, said first area adapted to receive pressure from an annulus between a tubing string and a well bore, and said second area arranged to receive pressure from a well tubing.

11. The gas injection valve of claim 10 further comprising abutment shoulder means on said valve member means and in said tubular housing, and resilient biasing means between said abutment shoulder means on said valve member means and said abutment shoulder means in said housing.

12. A gas injection assembly for gas lifting well fluids in a tubing string in a well bore, said assembly comprising:

assembly housing means having parallel adjacent tubular passages and adapted for interconnection into a string of well tubing;

differential pressure responsive gas injection valve means in one of said tubular passages, the other of said passages being coaxially aligned with the tubing string bore passage, with said gas injection valve means further comprising:

an elongated tubular valve housing having an internal annular seal flange and port means through the wall above said flange;

an elongated tubular valve member slidably and concentrically located in said housing, having an internal bore passage passing substantially the entire length of said member, and having a plurality of elongated openings through the wall thereof passing above and below said seal flange;

said valve member arranged to engage in valving relationship the lower portion of the inner bore passage of said housing;

resilient biasing means urging said valve member out of sealing relationship with said housing lower bore passage;

a first pressure responsive area on said valve member communicating with said ports in said valve housing;

a second pressure responsive area on said valve member communicating with said valve housing lower bore portion; and, backflow preventing valve means between said injection valve means and said coaxially aligned bore passage.

13. The gas injection assembly of claim 12 wherein said backflow prevention valve means comprises a check valve arranged to allow gas flow into said coaxially aligned bore passage and prevent fluid or gas backflow from said aligned bore passage.

14. The gas injection assembly of claim 13 further comprising expandable bellows means in said valve housing containing a compressed gas charge adapted to respond to reduced gas pressure in said valve housing to expand against said valve member and urge said member into sealing engagement in said valve housing lower passage.

* * * * *